United States Patent [19]

Wuesthoff

[11] 4,340,763

[45] Jul. 20, 1982

[54] WINNING BITTER SUBSTANCES FROM HOPS

[75] Inventor: Michael T. Wuesthoff, Gales Ferry, Conn.

[73] Assignee: Pfizer Inc., New York, N.Y.

[21] Appl. No.: 250,794

[22] Filed: Apr. 3, 1981

Related U.S. Application Data

[63] Continuation-in-part of Ser. No. 155,686, Jun. 2, 1980, abandoned, which is a continuation-in-part of Ser. No. 110,414, Jan. 7, 1980, abandoned.

[51] Int. Cl.³ ............................................. C07C 45/32
[52] U.S. Cl. .................................................. 568/344
[58] Field of Search .......................... 568/344; 426/600

[56] References Cited

U.S. PATENT DOCUMENTS

| | | | |
|---|---|---|---|
| 2,652,333 | 9/1953 | Nilsson et al. | 99/50.5 |
| 3,977,953 | 8/1976 | Frhr et al. | 204/158 R |
| 4,013,721 | 3/1977 | Reininger et al. | 260/586 D |

FOREIGN PATENT DOCUMENTS

805280 1/1974 Belgium .
701177 12/1953 United Kingdom .

OTHER PUBLICATIONS

Wright, J. Chem. Soc., (London), 1769, (1963).
Sweett et al., Chem. Abstracts, vol. 78, 146,298k, (1973).
Brown et al., J. Chem. Soc., (London), 4774, (1964).

*Primary Examiner*—Natalie Trousof
*Assistant Examiner*—James H. Reamer
*Attorney, Agent, or Firm*—Charles J. Knuth; Albert E. Frost; J. Trevor Lumb

[57] ABSTRACT

The process for producing hulupones by oxidation of lupulones, using an oxygen-containing gas, in a substantially aqueous, alkaline reaction medium is improved by carrying out the reaction using conditions under which the hulupones precipitate from the reaction medium as a salt, and are then recovered from the reaction medium as a salt. Hulupones are known substances which can be used as bittering agents, particularly in the brewing industry.

20 Claims, No Drawings

WINNING BITTER SUBSTANCES FROM HOPS

CROSS-REFERENCE TO RELATED APPLICATIONS

This application is a continuation-in-part of co-pending application Ser. No. 155,686, filed June 2, 1980, now abandoned, which is a continuation-in-part of application Ser. No. 110,414, filed Jan. 7, 1980, now abandoned.

BACKGROUND OF THE INVENTION

This invention relates to an improved method for winning bitter substances from hops and rendering them suitable for use as bittering agents in beer making. More particularly, it relates to an improved process for converting the so-called beta-acid component of the hop resins from hop cones, which are normally discarded in conventional brewing processes, into a form which can be used satisfactorily as a bittering agent in beer making. This process is an oxygenation reaction, in which lupulones are converted into hulupones.

Processes for the oxygenation of lupulones to hulupones are described in Belgian Pat. No. 805,280; British Pat. No. 701,177; and U.S. Pat. Nos. 4,013,721; 3,977,953; and 2,652,333.

SUMMARY OF THE INVENTION

This invention provides an improvement in the process for producing hulupones by oxidation of lupulones, using an oxygen-containing gas, in a substantially aqueous reaction medium rendered alkaline by the addition of an alkalyzing agent. Said improvement consists of carrying out the process using conditions under which the hulupone product precipitates out of the reaction medium as the sodium or potassium salt, and is then recovered from the reaction medium as said sodium or potassium salt. Precipitation of said sodium or potassium salt is caused to occur quite conveniently by using a sodium-ion or potassium-ion containing alkalyzing agent, and running the process with higher initial concentrations of lupulones than have been used hitherto. When conventional initial concentrations of lupulones are used, the same effect, i.e. that of causing the hulupones to precipitate as a sodium or potassium salt, is achieved by using a reaction medium in which there is a high concentration of sodium or potassium ions. When a high sodium or potassium ion concentration is used, the sodium or potassium ions can be derived from the alkalyzing agent, or from a supplementary sodium ion or potassium ion source. Additionally, when a high sodium ion or potassium ion concentration is used, the sodium or potassium ions can be derived partly from the alkalyzing agent and partly from a supplementary sodium ion or potassium ion source. The sodium or potassium hulupone salt is conveniently recovered from the reaction medium by filtration or decantation.

DETAILED DESCRIPTION OF THE INVENTION

Hops have been used in the brewing industry for hundreds of years, on account of their content of bitter substances. In a conventional brewing process, the hop cones are boiled with sweet wort in a copper kettle for about one to two hours, and then the wort is filtered and allowed to cool. During this boiling process, only a portion of the hop resins (the so-called alpha-acids or humulones) are extracted, and considerable residue (the so-called beta-acids or lupulones) remains on the hop strainer. The latter material is then discarded.

On the other hand, it was discovered that if hop cones which had been aged were examined, the lupulones had been partially converted into hulupones. These latter substances are freely soluble in the wort and have an excellent bitter taste. Following this discovery, much effort was expended to try and bring about the lupulone to hulupone conversion artifically, and in a manner that would be fast and economical enough to permit utilization of the lupulone-containing material which had previously been discarded.

Several methods have been developed for the oxidative conversion of lupulones to hulupones. For example, the conversion can be carried out using oxygen in the presence of sodium sulfite in alcoholic solution, or with sodium peroxydisulfate in ethanol. In another method lupulone-containing substances were dissolved in trichloroethylene and treated with oxygen.

However, the simplest and most convenient method of carrying out this conversion comprises dissolving lupulone-containing material in a substantially aqueous reaction medium, at an alkaline pH, and treating this solution with oxygen gas, optionally in the presence of a catalyst. Although this method has been used successfully, it suffers from disadvantages, and the purpose of the present invention is to provide an improvement in this process. Said improvement comprises conducting the reaction using conditions under which substantially all of the hulupone product precipitates from the reaction medium as a sodium or a potassium salt, and the hulupone product is then recovered from the reaction medium as said sodium or potassium salt. Whereas prior art processes require that the reaction mixture be acidified and extracted with a water-immiscible organic solvent, the process of the present invention involves direct isolation of the hulupone salts.

The present process offers the unexpected advantage of providing a higher yield of hulupones and of providing hulupones of higher purity then has been possible hitherto. In particular, the expedient of causing the products to precipitate avoids the problem of overoxidation, a common problem with the prior art processes. Additionally, by causing the products to precipitate, a purer product is obtained, since impurities are retained in solution.

Also, the use of concentrated solutions offers economic advantages and advantages of convenience when working on an industrial scale.

In carrying out the process of this invention, lupulones, or lupulone-containing material, are dissolved in a substantially aqueous solution, at a pH in the range from about 10 to about 14, preferably 13 to 14. This solution is then contacted with an oxygen-containing gas, at a temperature in the range from about 25° to about 100° C., preferably 50°–90° C. It is possible simply to bubble the oxygen-containing gas through the reaction medium, with good agitation; however, particularly when working on a large scale, it is usually more convenient to use a sealed reaction vessel containing the lupulone solution and substantially pure oxygen gas. Under these conditions the pressure inside the reaction vessel is usually in the range from about 10 to about 120 psig, with a pressure of about 50 to about 100 psig being preferred. When the conversion of lupulones to hulupones is substantially complete, the hulupone product is recovered from the reaction medium as the sodium or potassium salt. The hulupone salt is recovered by conventional means, e.g. by filtration or decantation of the reaction medium.

When the product is recovered by filtration, it is usually preferable to add a filter aid, e.g. Celite (a diatomaceous earth), and to chill the reaction medium, e.g. to 5°–10° C., before filtering. The product can then be separated from the filter aid by dissolution in an organic solvent, e.g. methanol, followed by filtration and solvent evaporation.

The pH value of 10 to 14 is achieved by adding an alkalyzing agent to the reaction medium, and a wide variety of alkalyzing agents can be used, including both organic and inorganic types. The major requirements for the alkalyzing agent are that the $pK_a$ of its conjugate acid must be sufficiently high that a pH of 10 to 14 can be achieved, and the alkalyzing agent must not adversely interact with either the lupulone reactant or the hulupone product. Examples of organic alkalyzing agents are tertiary amines, such as triethylamine or N-methylpiperidine; examples of inorganic alkalyzing agents are the hydroxides, carbonates and phosphates of the alkali metals, e.g. the hydroxides, carbonates and phosphates of sodium and potassium. Sodium hydroxide and potassium hydroxide are particularly useful agents.

The term "oxygen-containing gas" refers to pure oxygen and to oxygen diluted with inert diluents such as nitrogen and argon, and it includes air.

Reaction times vary according to a variety of factors, such as the reaction temperature, the concentration of the lupulone solution and the partial pressure of the oxygen. However, at a temperature of 50° to 90° C., and working in a sealed vessel with pure oxygen at a pressure of about 50 to 100 psig, with lupulone concentrations of about 3 to 30 gm/100 ml. of reaction medium, reaction times of about 0.5 to 2 hours are commonly used. In any event, it is usually preferable to monitor the reaction by following oxygen uptake. Usually the reaction is stopped when from about 100 to about 170 mole percent of oxygen has been absorbed, based on the initial lupulone starting material.

As indicated hereinbefore, the process of this invention is carried out under conditions which cause the hulupone product to precipitate as its sodium or potassium salt. This is most simply achieved by using a sodium-ion or potassium-ion containing alkalyzing agent and working at higher initial concentrations of lupulones than have been used hitherto. Specifically, it has been found that when a sodium-ion or potassium-ion containing alkalyzing agent is used, substantially all the hulupones (i.e. at least 85%) will precipitate if an initial concentration of lupulones of between 15 and 30 gm/100 ml. of reaction medium is used. The preferred initial lupulone concentration is 20 to 25 gm/100 ml. of reaction medium.

The process of this invention can also be carried out at initial lupulone concentrations of less than 15 gm/100 ml. of reaction medium. Under these circumstances, the hulupone product is induced to precipitate (as its sodium or potassium salt) by conducting the reaction in the presence of a large excess of a cation selected from the group consisting of sodium and potassium. Effectively, this depresses the solubility of the sodium or potassium salt of the hulupone, and thus causes it to precipitate. Using this technique, initial concentrations of lupulones of as low as about 3 gm/100 ml. of reaction medium can be oxidized efficiently.

Total concentrations of sodium ions from about 0.5 to about 3.0 molar, and total concentrations of potassium ions from about 1.0 to about 5.0 molar, are normally used. Clearly, cation concentrations from the higher ends of these ranges are preferred when the initial concentration of lupulones is low, while cation concentrations from the lower ends of these ranges are preferred when the initial concentration of lupulone is high.

In order to achieve the excess sodium ion or potassium ion levels, it is possible simply to use an excess of a sodium-ion containing or potassium-ion containing alkalyzing agent. Thus, when a sodium-ion concentration of 0.5 to 3.0 molar is required, sufficient sodium-ion containing alkalyzing agent, such as sodium hydroxide, sodium carbonate or sodium phosphate, or mixture thereof, is added to give the requisite concentration. In like manner, when a potassium ion concentration of 1.0 to 5.0 molar is required, sufficient potassium-ion containing alkalyzing agent, such as potassium hydroxide, potassium carbonate or potassium phosphate, or mixture thereof, is added to give the requisite concentration.

However, when using a sodium-ion containing or potassium-ion containing alkalyzing agent, it is possible to use a reaction medium in which some of the sodium or potassium ion comes from the alkalyzing agent and the remainder comes from the addition of one or more supplementary cation sources. Additionally, when using an alkalyzing agent which does not contain sodium or potassium ions, it is possible to use a reaction medium in which all the sodium or potassium ion comes from the addition of one or more supplementary cation sources.

A wide variety of supplementary cation sources can be used. The major requirements for such an agent are that it liberates ionic sodium or potassium on dissolution in water, and that the counterion thus liberated does not adversely affect the lupulones or the hulupones. Sodium or potassium salts of both inorganic and organic acids can be used; however, for reasons of accessibility and economy, convenient supplementary sodium ion sources are sodium chloride, sodium sulfate and sodium acetate, and convenient supplementary potassium ion sources are potassium chloride, potassium sulfate and potassium acetate.

As indicated hereinbefore, the process of this invention represents an improvement over known processes for oxidizing lupulones to hulupones, with oxygen gas, in a substantially aqueous, alkaline medium. It is known that such processes can be carried out in the presence of a wide variety of catalysts, and it is to be understood that the improvement disclosed and claimed herein applies equally well to catalyzed as well as uncatalyzed processes. It is known that both homogeneous and heterogeneous catalysts can be used and that heterogeneous catalysts can be used in both supported and unsupported forms. The improvement of this invention applies in all situations. In particular, the improvement applies to the processes disclosed in U.S. Pat. Nos. 4,013,721 and 2,652,333, and Belgian Pat. No. 805,280.

The hulupone product obtained from the process of this invention can be purified by known methods for hulupone compounds, if desired. In the case wherein a heterogeneous catalyst has been used, a simple method of purification which is often used involves dissolution of the hulupone salt is methanol, filtration of the methanol solution and removal of the methanol by solvent evaporation.

The following examples are provided for further illustration; however, they are not to be construed as imposing any limitations on this invention, since many variations are possible without deviating from the spirit and scope thereof.

EXAMPLE 1

Oxidiation of a Colupulone-Lupulone Mixture Using a Cobaltic Oxide Catalyst

To a solution of 100.0 g. (246 mmole) of a 65:35 colupulone-lupulone mixture, in 500 ml. of 1.5 M sodium hydroxide, 1.0 g. of cobaltic oxide catalyst was added. The reaction vessel was charged with nitrogen to 30 psig, and then heated to 60° C. with shaking. At this point the shaking was stopped, the nitrogen pressure was released, and the reaction vessel was charged with oxygen to a pressure of 70 psig. The vessel was shaken and heated for 40 minutes. During this period the temperature and pressure varied according to the following:

| Time (Minutes) | | Pressure (psig) | Temperature (°C.) |
| --- | --- | --- | --- |
| 0 | | 70 | 80 |
| 1 | | 65 | 80 |
| 2 | | 62 | 80 |
| 3 | | 60 | 88 |
| 4 | | 57 | 88 |
| 6 | | 54 | 98 |
| 9 | | 52 | 98 |
| 11 | (repressurized) | 70 | 98 |
| 13 | | 68 | 98 |
| 20 | | 65 | 98 |
| 28 | | 62 | 98 |
| 40 | | 60 | 98 |

At this point the shaking was stopped, the reaction vessel was cooled, and the oxygen pressure was released. Total oxygen consumption was 350 mmole, which is equivalent to 1.42 mole per mole of lupulones.

The supernatant liquid was removed by decantation, and the residue was washed twice with 150 ml. of water. This afforded 63.0 g. of crude cohulupone-hulupone product.

The product was assayed by ultraviolet spectroscopy, according to standard techniques. The assay indicated that the crude product contained 50% hulupones, which corresponds to a 40% yield.

The product was also assayed by high-pressure liquid chromatography (HPLC), according to standard techniques. This assay indicated that the crude product contained 34% cohulupone and 19% hulupone. This corresponds to a 42% yield of hulupones.

EXAMPLE 2

Oxidation of Colupulone

To a solution of 5.0 g. (12.5 mmoles) of colupulone in 25 ml. of 1.5 M sodium hydroxide in a pressure bottle, was added the catalyst (see Table I, below). The reaction vessel was heated to the reaction temperature (Table I), pressurized to 55–60 psig with oxygen, and shaken until the pressure drop leveled off. The reaction vessel was cooled to room temperature, and the supernatant liquid was removed by decantation. The residue was washed with water and then it was dissolved in methanol. The methanol solution was filtered (except for Run 5), and evaporated to dryness in vacuo to give the crude product. The product was assayed for cohulupone by ultraviolet spectroscopy, according to standard techniques.

TABLE I

| Run | Catalyst | Temperature (°C.) | Reaction time (mins) | Oxygen uptake (mmole) | Crude yield (g.) | Product purity (% sodium cohulupone) | Yield (%) corrected for purity |
| --- | --- | --- | --- | --- | --- | --- | --- |
| 1 | 151 mg. of 10% platinum-on-carbon | 25 | 91 | 20.5 | 3.05 | 53.6 | 38 |
| 2 | 60 mg. of 10% platinum-on-carbon | 100 | 64 | 19.0 | 2.79 | 57.7 | 38 |
| 3 | None | 80 | 42 | 19.0 | 2.28 | 61.7 | 33 |
| 4 | 51 mg. of 10% platinum-on-carbon | 50 | 40 | 20.2 | 2.65 | 70.0 | 44 |
| 5 | 203 mg. sodium vanadate | 80 | 50 | 20.1 | 2.95 | 55.6 | 39 |
| 6 | 39 mg. of platinum | 80 | 31 | 22.7 | 2.76 | 62.4 | 41 |
| 7 | 47 mg. of cobaltic oxide | 80 | 35 | 17.3 | 3.39 | 57.9 | 46 |
| 8 | 47 mg. of platinum oxide | 80 | 63 | 19.6 | 2.43 | 70.2 | 40 |

EXAMPLE 3

Oxidation of Colupulone in the Presence of Sodium Sulfate

To a solution of 2.5 g. (6.24 mmole) of colupulone and 5.4 g. (38 mmole) of sodium sulfate in 38 ml. of 0.5 M sodium hydroxide, in a pressure vessel, was added 95 mg. of 10% platinum-on-carbon. The reaction vessel was heated to 80° C. and pressurized to 60 psig with oxygen. The reaction vessel was then shaken until the pressure drop leveled off. This required 100 minutes, and the oxygen uptake was 10.0 mmole. The supernatant liquid was removed by decantation, and the residue was washed with water and dissolved in methanol. The catalyst was removed by filtration, and then evaporation in vacuo afforded 1.47 g. of a light brown solid, containing 58% cohulupone sodium salt, according to an assay by ultraviolet spectroscopy.

EXAMPLE 4

The procedure of Example 3 is repeated, except that the sodium sulfate is replaced by 76 mmoles of sodium chloride and sodium acetate, respectively. This affords, in each case, cohulupone sodium salt.

EXAMPLE 5

Cohulupone Potassium Salt

To a solution of 6.0 g. (15 mmole) of colupulone and 4.0 g. (23 mmole) of potassium sulfate in 38 ml. of 1.5 M potassium hydroxide, in a pressure vessel, is added 100 mg. of 10% platinum-on-carbon. The reaction vessel is heated to 80° C., and then it is pressurized to 60 psig with oxygen. The reaction vessel is shaken until the pressure drop levels off. The reaction vessel is cooled and opened, and the supernatant liquid is removed by decantation. The residue is washed with a small volume of cold water, and then methanol is added. The insoluble material is removed by filtration, and then the methanol is removed by evaporation in vacuo, to give cohulupone potassium salt.

EXAMPLE 6

The procedure of Example 5 is repeated, except that the potassium sulfate is replaced by 90 mmoles of potassium chloride and potassium acetate, respectively. This affords, in each case, cohulupone potassium salt.

EXAMPLE 7

Oxidation of a Crude Beta-Acid
Fraction of Hop Extract

To 50 ml. of a basic aqueous hop extract fraction, 1.4 M in sodium hydroxide, and containing 8.65 g. (21.4 mmole) of beta-acids according to an assay by ultraviolet spectroscopy, in a pressure vessel, was added 101 mg. of cobaltic oxide. The reaction mixture was heated to 80° C., pressurized to 70 psig with oxygen, and then shaken until the pressure drop began to level off. This took 24 minutes, and the oxygen consumption was 30.8 mmole. The supernatant liquid was removed by decantation, and the residue was washed with water. The residue was then dissolved in methanol. The methanol solution was filtered and then evaporated to dryness to give 6.57 g. of a light brown solid. Assay by ultraviolet spectroscopy indicated that the product contained 36.2% hulupones (33% yield).

I claim:

1. An improved process for the oxidation of lupulones to hulupones, using an oxygen-containing gas, in a substantially aqueous reaction medium rendered alkaline using a sodium-ion or potassium-ion containing alkalyzing agent, at a temperature in the range from about 25° to about 100° C., wherein the improvement comprises:
   (i) carrying out the process under conditions under which substantially all of the hulupones are caused to precipitate from the reaction medium as a sodium or a potassium salt by using an initial concentration of lupulones in the range from 15 to 30 gm/100 ml of reaction medium; and
   (ii) recovering the hulupones from the reaction medium as said sodium or potassium salt.

2. The process according to claim 1, wherein said initial concentration of lupulones is in the range from 20 to 25 gm/100 ml. of reaction medium.

3. An improved process for the oxidation of lupulones to hulupones, using an oxygen-containing gas, in a substantially aqueous reaction medium rendered alkaline using an alkalyzing agent, at a temperature in the range from about 25° to about 100° C., and using an initial concentration of lupulones of at least 3 gm/100 ml. of reaction medium, wherein the improvement comprises:
   (i) carrying out the process in a reaction medium to which sodium ions have been added to give a concentration of sodium ions in the range from 0.5 to 3.0 molar and sufficient to cause substantially all of the hulupones to precipitate from the reaction medium as the sodium salt; and
   (ii) recovering the hulupones from the reaction medium as said sodium salt.

4. The process according to claim 3, wherein said concentration of sodium ions is achieved by the addition of a sodium-ion containing alkalyzing agent.

5. The process according to claim 3, wherein said concentration of sodium ions is achieved by the addition of an alkalyzing agent selected from the group consisting of sodium hydroxide, sodium carbonate and sodium phosphate.

6. The process according to claim 5, wherein said alkalyzing agent is sodium hydroxide.

7. The process according to claim 3, wherein said concentration of sodium ions is achieved by the addition of a sodium-ion containing alkalyzing agent and by the addition of a supplementary sodium ion source.

8. The process according to claim 7, wherein said sodium-ion containing alkalyzing agent is selected from the group consisting of sodium hydroxide, sodium carbonate and sodium phosphate.

9. The process according to claim 8, wherein said supplementary sodium ion source is selected from the group consisting of sodium chloride, sodium sulfate and sodium acetate.

10. The process according to claim 9, wherein said supplementary sodium ion source is sodium sulfate.

11. The process according to claim 9, wherein said supplementary sodium ion source is sodium chloride.

12. An improved process for the oxidation of lupulones to hulupones, using an oxygen-containing gas, in a substantially aqueous reaction medium rendered alkaline using an alkalyzing agent, at a temperature in the range from about 25° to about 100° C., and using an initial concentration of lupulones of at least 3 gm/100 ml. of reaction medium, wherein the improvement comprises:
   (i) carrying out the process in a reaction medium to which potassium ions have been added to give a concentration of potassium ions in the range from 1.0 to 5.0 molar and sufficient to cause substantially all of the hulupones to precipitate from the reaction medium as the potassium salt; and
   (ii) recovering the hulupones from the reaction medium as said potassium salt.

13. The process according to claim 12, wherein said concentration of potassium ions is achieved by the addition of a potassium-ion containing alkalyzing agent.

14. The process according to claim 12, wherein said concentration of potassium ions is achieved by the addition of an alkalyzing agent selected from the group consisting of potassium hydroxide, potassium carbonate and potassium phosphate.

15. The process according to claim 14, wherein said alkalyzing agent is potassium hydroxide.

16. The process according to claim 12, wherein said concentration of potassium ions is achieved by the addition of a potassium-ion containing alkalyzing agent and by the addition of a supplementary potassium ion source.

17. The process according to claim 16, wherein said potassium-ion containing alkalyzing agent is selected from the group consisting of potassium hydroxide, potassium carbonate and potassium phosphate.

18. The process according to claim 17, wherein said supplementary potassium ion source is selected from the group consisting of potassium chloride, potassium sulfate and potassium acetate.

19. The process according to claim 18, wherein said supplementary potassium ion source is potassium sulfate.

20. The process according to claim 18, wherein said supplementary potassium ion source is potassium chloride.

* * * * *